Dec. 20, 1966    C. V. CROCKETT    3,292,943
OFF-ROAD MOTOR VEHICLE
Original Filed April 2, 1963    2 Sheets-Sheet 1

INVENTOR.
Clarence V. Crockett
BY
E. J. Biskup
ATTORNEY

Dec. 20, 1966  C. V. CROCKETT  3,292,943
OFF-ROAD MOTOR VEHICLE
Original Filed April 2, 1963  2 Sheets-Sheet 2

INVENTOR.
Clarence V. Crockett
BY
E. J. Biskup
ATTORNEY

United States Patent Office 3,292,943
Patented Dec. 20, 1966

3,292,943
OFF-ROAD MOTOR VEHICLE
Clarence V. Crockett, Bloomfield Hills, Mich., assignor to General Motors Corporation, Detroit, Mich., a corporation of Delaware
Original application Apr. 2, 1963, Ser. No. 270,053. Divided and this application Apr. 25, 1966, Ser. No. 545,113
7 Claims. (Cl. 280—104)

This is a division of Serial No. 270,053, filed April 2, 1963, in the name of Clarence V. Crockett, and entitled Off-Road Motor Vehicle.

This invention relates to an off-road motor vehicle and, more particularly, to an improved construction of such vehicle which provides positive positioning of the vehicle body support means in response to movement of the wheel-supporting axles about the longitudinal axis of the vehicle.

One form of an off-road vehicle at times employed commercially or by the military comprises a front frame section and a rear frame section interconnected by a swivel joint which permits relative pivotal movement of the frame sections about an axis extending longitudinally of the vehicle. Typically, one of the frame sections is used for supporting the load-carrying body while the other frame section carries the operator's cab and an engine which transmits drive through suitable gearing to ground-engaging wheels supported by axles mounted on the respective frame sections. Although a construction of this sort has been found to facilitate vehicle travel over rough terrain by permitting all of the wheels to maintain driving engagement with the ground, a problem does arise in that the vehicle operator and load are subjected to drastic rolling type movement as the frame sections tilt with respect to each other about the swivel joint.

The present invention contemplates an improved vehicle construction which eliminates extreme sidewise rocking movement of the cab and load but permits substantially unlimited relative pivotal movement of the front and rear wheel supporting axles about the longitudinal axis of the vehicle as in the above-described vehicle. This is accomplished by providing a motor vehicle construction in which the relative pivotal movement of the wheel supporting axles serves to positively locate the vehicle body support. Stated broadly, a motor vehicle constructed in accordance with the invention comprises front and rear wheel-carrying axles which are interconnected through a body support member. Means are interposed between the axles and the body support member so that upon relative pivotal movement of the axles about an axis extending longitudinally of the vehicle, the body support member is positively positioned about the axis.

A more complete understanding of this invention can be obtained from the following detailed description taken in conjunction with the drawings in which.

Figure 1:
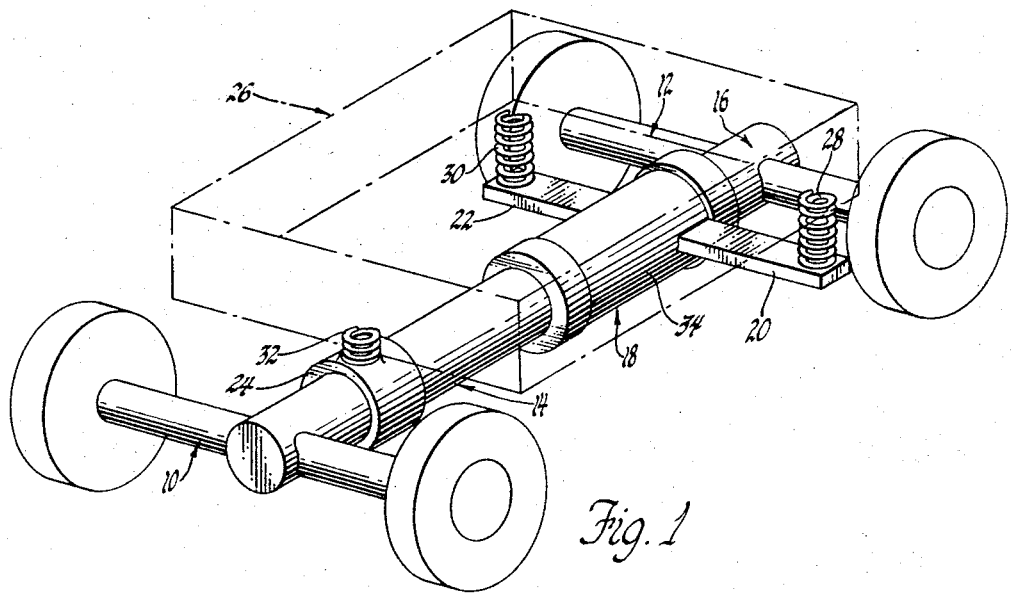
FIGURE 1 is a perspective view of a motor vehicle constructed in accordance with the invention.
Figure 2:
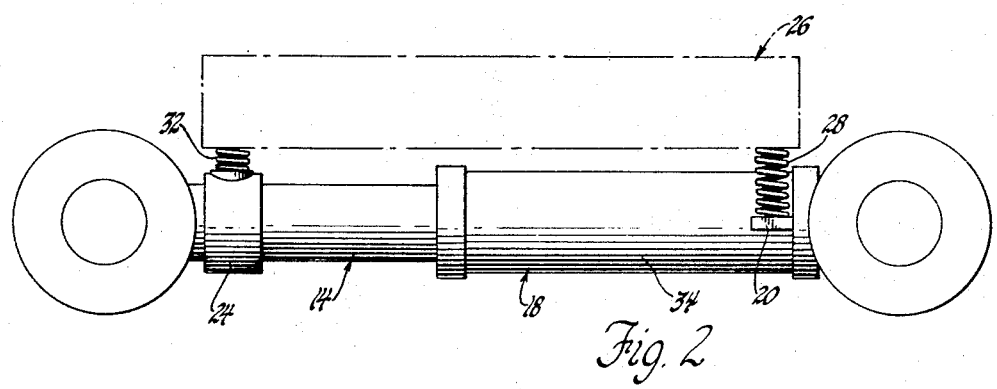
FIGURE 2 is an elevation view of the motor vehicle of FIGURE 1.

Referring now to the drawings and specifically to FIGURES 1 and 2 thereof, a motor vehicle is shown comprising a front axle 10 and a rear axle 12 each of which rotatably supports ground engaging wheels at the opposite ends thereof in a conventional manner. Both the front and rear axle are rigidly connected at the center thereof to tubular beams 14 and 16 respectively which are supported in axial alignment within a body support member generally indicated by the numeral 18. The body support member has a pair of laterally extending arms 20 and 22 projecting from opposite sides thereof and fixed thereto which together with a support collar 24, that is rotatably mounted on the beam 14, serve to suitably support a vehicle body 26. The vehicle body is shown in rectangular block form and terminates at opposite ends just prior to the path of rotative movement of each axle upon the longitudinal axis of the beams so as not to interfere with such movement.

At this juncture, it should be understood that although the vehicle is shown in a somewhat schematic form, the invention is intended for use with one having the usual components for driving the vehicle including engine, transmission and suitable gearing directing drive to the ground-engaging wheels. In this connection, the block-form body 26 represents a conventional off-road vehicle body having the aforementioned engine and driving components, all of which in this instance constitute the sprung mass. This mass is supported at three points; namely, on the arms of the body support member and the upper portion of the support collar, the latter serving as a pivot point for the front portion of the vehicle body. Suitable suspension means that includes coil springs 28, 30, 32 and other appropriate mechanism, not shown, restrains fore and aft, transverse, and yawing movement of the vehicle body. Moreover, the front wheels are intended to be steerable through suitable steering linkage, not shown, as is conventional in vehicles of this sort or as an alternative, an articulated connection can be interposed; for example, in the beam 14 between the axle 10 and the body support member 18 for effectuating wagon-type steering of the vehicle in a manner as illustrated in the patent to Bernotas 2,941,612. In other words, the manner of supporting the vehicle body and transmitting drive to the ground-engaging wheels and also steering are technologies well known to those skilled in the art and need not be shown in detail nor explained in order to comprehend this invention, it only being understood that such is contemplated by the inventor for the constructions shown in the aforementioned figures.

Figure 4:
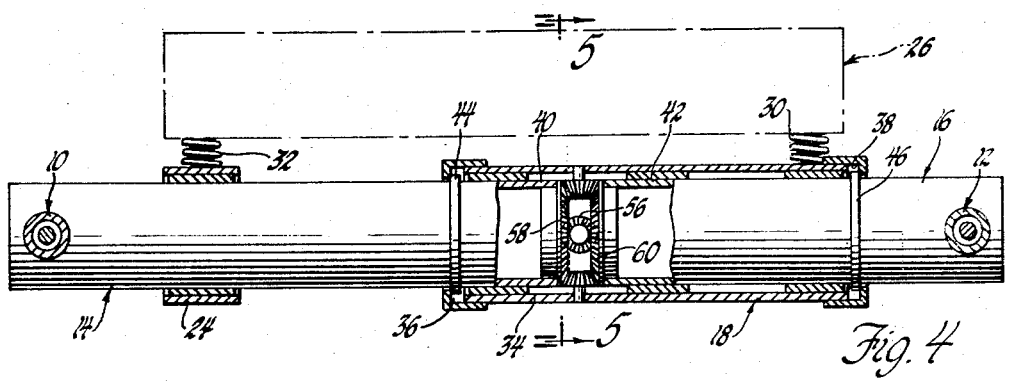
FIGURE 4 is an elevation view similar to FIGURE 2 with a portion thereof sectioned and illustrating the interconnection between the axles and the body support member.
Figure 5:
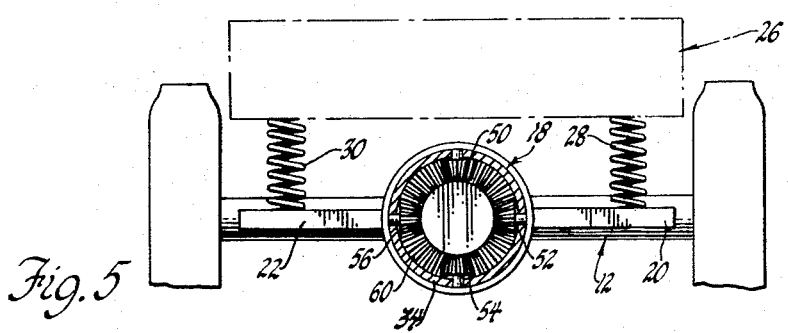
FIGURE 5 is a view taken on line 5—5 of FIGURE 4.

As shown in detail in FIGURE 4, the body support member 18 comprises a sleeve portion 34 which terminates at opposite ends with internal annular grooves 36 and 38. The inner ends 40 and 42 of the beams 14 and 16, respectively, are rotatably supported in the sleeve portion in spaced axial positions and are restricted from relative axial movement by the mating engagement of the annular guide rings 44 and 46, rigidly formed with the respective beams, and the aforementioned grooves in the body support member. As best seen in FIGURES 4 and 5, a differential gearing arrangement interconnects the front and rear beams with the body support member and comprises a pinion gear assembly including four bevel-type pinion gears 50, 52, 54 and 56, each of which is rotatably supported on a shaft having one end thereof secured to the sleeve portion 34 along an axis radially extending toward the center of the sleeve.

As is conventional in gearing arrangements of this sort, each of the pinion gears mesh with a pair of side gears 58 and 60 which, in this instance are fixed to the respective inner ends 40 and 42 of the beams. Thus, it should be apparent that when the vehicle is on level ground as seen in FIGURES 1 and 2, the support arms 20 and 22 are located in a horizontal plane so as to maintain the rear of the vehicle body 26 level. However, should one of the axles 10 or 12 be rotated about the longitudinal axis of the vehicle, such as would occur when a wheel rides over an obstruction, the associated beam would also be rotated and through the differential gearing arrangement cause the body support member and the attached arms to be repositioned. This will be more fully explained in the description of the operation of the invention which now follows.

Figure 3:
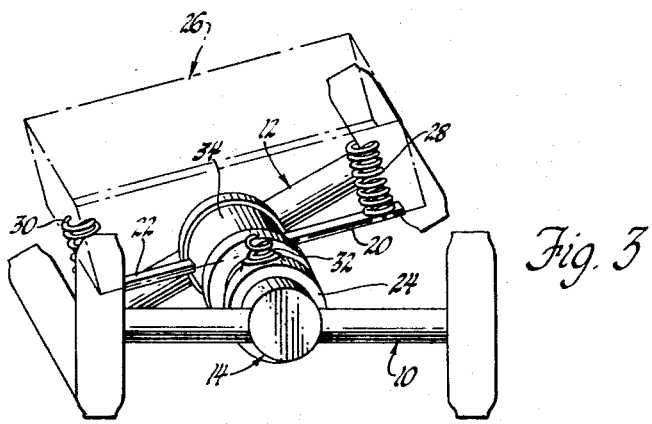
FIGURE 3 is a front end view of the vehicle of FIGURE 1 and illustrates the relative positions of the axles and the body support member when one axle is rotated relative to the other a predetermined distance.

To best understand the workings of this invention, it can be assumed that the vehicle of FIGURES 1 and 2 is operating over irregular terrain so as to cause one wheel of the rear axle to ride over an obstruction as shown in FIGURE 3 and be rotated a predetermined angular distance with respect to the front axle. This movement, of course, would cause the side gear 60 to rotate the pinions on the body support member, and depending upon the gearing ratio provided in the differential arrangement, would result in a predetermined positioning of the body support member about the longitudinal axis of the vehicle. For present purposes, it can be assumed that the gearing ratio of the differential gearing arrangement is such that for a predetermined rotation of one axle, a 50% reduction will occur in the movement of the body support member. Hence, should the rear axle be tilted 45°, this would result in the body support member and the arms 20 and 22 being rotated one-half or 22½° about the longitudinal axis of the vehicle. This would cause a repositioning of the vehicle body 26; however, due to the suspension system, the vehicle body would experience a rolling movement less than the 22½°. In other words, the suspension system provided between the body support member and the vehicle body would provide some compensating stabilizing effect upon the body so that the latter will not be tilted the same amount as the body support member. Thus, it should be apparent that the rolling movement of the vehicle body would be substantially less than any predetermined angular displacement of either the front or the rear axle as the vehicle wheels ride over bumps.

A further feature provided by this invention is that in instances where the tilting movement of the front and the rear axles is in opposite directions about the longitudinal axis of the vehicle but of an equal angular displacement, the net effect upon the vehicle body is nil and the body is maintained level. In other words, in the example described above, should the rear axle 12 be tilted 45° in a counterclockwise direction while the front axle 10 is tilted the same amount in a clockwise direction, the differential gearing arrangement would, of course, provide a compensating action with no resultant effect upon the body support member 18 so that the latter will be maintained with the support arms in a normal position.

Figure 6:
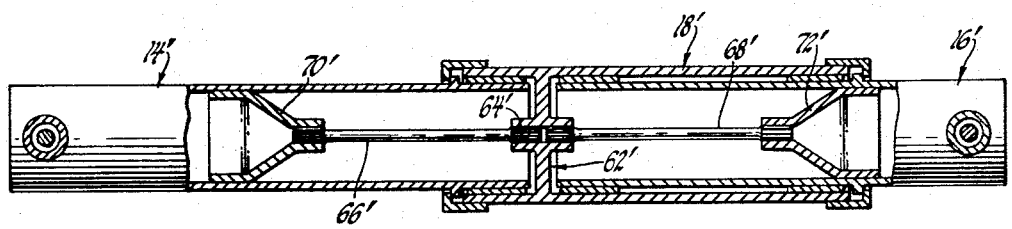
FIGURE 6 is a view similar to FIGURE 4 illustrating a modified form of the interconnection between the axles and body support member.

FIGURE 6 shows a modified form of the invention described above and illustrated in FIGURES 1 through 5, and differs therefrom only in that the differential gearing arrangement is replaced by a torsional bar arrangement. In this instance, the body support member 18' includes a rigid hub portion 62' having a splined opening 64' which accommodates similar splined end portions of a pair of torsion bars 66' and 68'. The opposite ends of the respective torsion bars are secured through bell-shaped support housings 70' and 72' to the front and rear beams 14' and 16'. Each torsion bar is designed so that during relative movement of the beams about their longitudinal axes, a predetermined positioning of the body support member 18' occurs in a manner as described with the construction of FIGURE 4.

Figure 7:
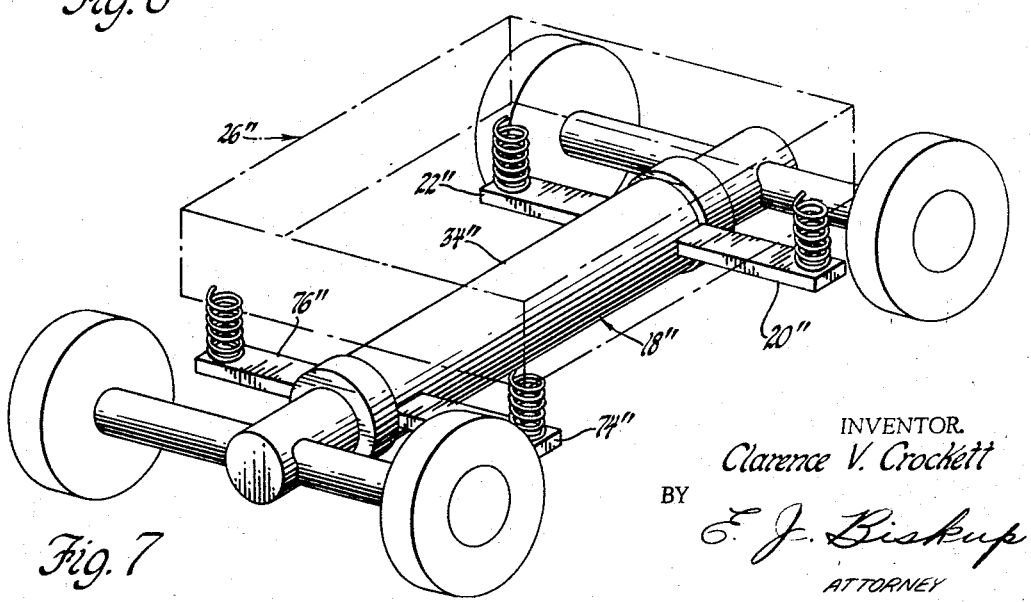
FIGURE 7 is a perspective view similar to FIGURE 1 illustrating a motor vehicle having a modified form of body support member.

FIGURE 7 illustrates a further modification of the vehicle of FIGURE 1. In this construction the sleeve portion 34" of the body support member 18" has been extended forwardly and in addition to the arms 20" and 22", includes a pair of laterally extending support arms 74" and 76" so as to provide a four-point suspension system for the vehicle body 26".

It should be apparent that various modifications can be made in this invention. For example, though only two forms of interconnections are shown between the axles and body support member; namely, a differential gearing assembly and a torsional bar arrangement, it should be apparent to one skilled in the art to substitute therefor a planetary gearing system or any other which would provide the positive reduction in movement of the body support member in response to pivotal movement of the axles. Also, the use of this invention is not restricted to four-wheel vehicles, it being a simple matter to substitute a bogey assembly for either the front or rear axle or for both and still obtain the same result. Furthermore, this invention can be used in cases where the vehicle is provided with more than two axles by interposing differential arrangements in series between each pair of axles. Thus, as can be seen from the above, various changes can be made in the described structure without departing from the spirit of the invention. Hence, it should be understood that the inventor contemplates such changes and modifications, and does not wish to be limited except by the scope of the appended claims.

I claim:
1. A vehicle comprising a body portion, a front and rear axle rotatably mounting wheels, first means rigid with the front axle and extending toward the rear axle, second means rigid with the rear axle and extending toward the front axle, third means connecting said first and second means and serving as a support for said body portion, and torsion bar means connecting said first, second and third means for positively positioning the latter about the longitudinal axis of said vehicle upon relative rotation of said axles about said axis.

2. The vehicle of claim 1 wherein said first and second means comprise longitudinally extending beams.

3. The vehicle of claim 1 wherein resilient suspension means are interposed between said body portion and said third means.

4. The vehicle of claim 1 wherein said torsion bar means includes a pair of torsion bars having the adjacent ends thereof connected to the third means and the opposite ends fixed with said first and second means.

5. The vehicle of claim 2 wherein said beams are tubular in cross section.

6. The vehicle of claim 4 wherein said torsion bars are axially aligned.

7. The vehicle of claim 1 wherein laterally extending arms are fixed with said third means for supporting said body portion.

References Cited by the Examiner

UNITED STATES PATENTS

| | | | |
|---|---|---|---|
| 2,090,561 | 8/1937 | Wagner | 280—112 |
| 2,221,196 | 11/1940 | Klavik | 280—112 |
| 2,610,073 | 9/1952 | Lilly | 280—111 X |
| 3,183,991 | 5/1965 | Gamaunt | 180—24 |

BENJAMIN HERSH, Primary Examiner.

M. S. SALES, Assistant Examiner.